United States Patent [19]

von Conrad et al.

[11] 3,712,550

[45] Jan. 23, 1973

[54] APPARATUS FOR PROCESSING EFFLUENT SLUDGE

[75] Inventors: Eugen von Conrad; Kurt Rosner; Ludwig Meyer, all of Munster/Westf., Germany

[73] Assignee: Hazemag GmbH, Munster, Germany

[22] Filed: April 19, 1971

[21] Appl. No.: 135,106

Related U.S. Application Data

[62] Division of Ser. No. 851,970, Aug. 21, 1969, Pat. No. 3,659,792.

[30] Foreign Application Priority Data

Aug. 23, 1968 Germany....................P 17 84 605.8

[52] U.S. Cl. ............................241/41, 241/60, 241/62
[51] Int. Cl. ................................................B02c 13/09

[58] Field of Search.......241/41, 46.02, 46.08, 60, 62

[56] References Cited

UNITED STATES PATENTS

| 2,505,674 | 4/1950 | Knight ..............................241/41 X |
| 2,105,759 | 1/1938 | Stevenson ..............................241/41 |
| 2,543,599 | 2/1951 | Rietz ..............................241/41 X |
| 2,729,858 | 1/1956 | Horton et al. ....................241/41 X |
| 3,018,972 | 1/1962 | Steinmetz..............................241/41 |

Primary Examiner—Granville Y. Custer, Jr.
Attorney—Michael S. Striker

[57] ABSTRACT

Effluent sludge obtained upon clarification of waste effluent is admixed with solid refuse either before or subsequent to reduction of the solid refuse to particulate state in an impact grinder.

8 Claims, 1 Drawing Figure

PATENTED JAN 23 1973
3,712,550
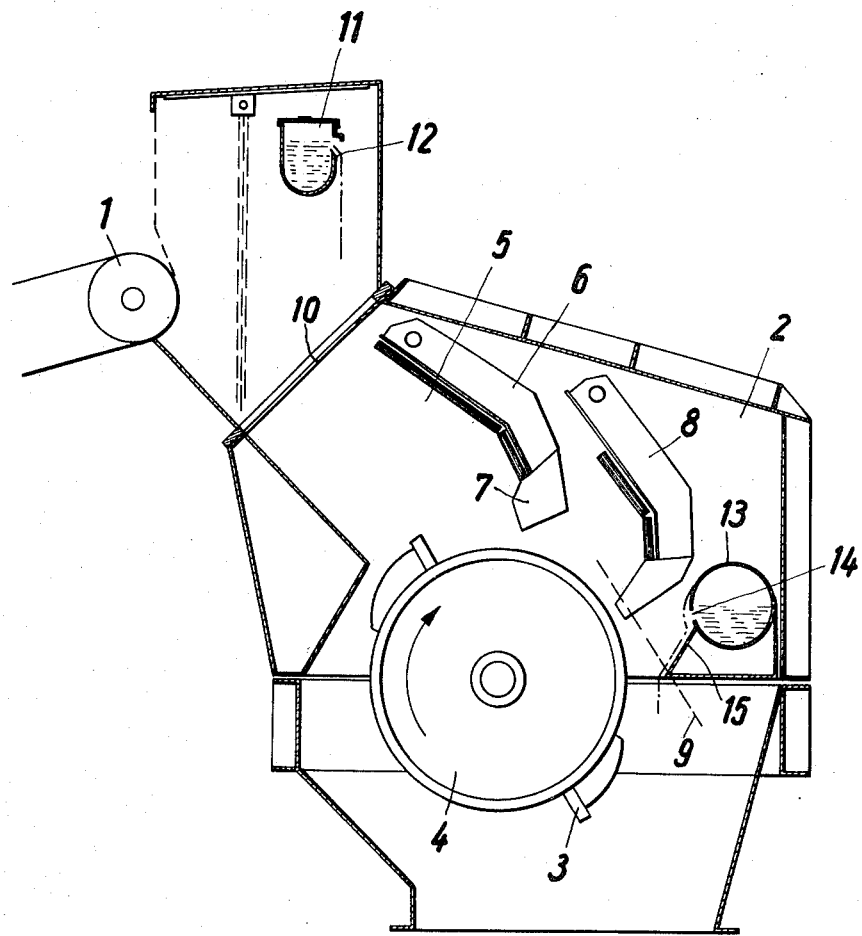
Inventor:
EUGEN VON CONRAD
KURT ROSNER
LUDWIG MEYER
By: Michael S. Striker
Att...

APPARATUS FOR PROCESSING EFFLUENT SLUDGE

CROSS-REFERENCE TO RELATED APPLICATION

This application is a division of our co-pending application, Ser. No. 851,970, filed Aug. 21, 1969 and entitled "Method and Apparatus for Processing Effluent Sludge", now U.S. Pat. No. 3,659,792, issued May 2, 1972.

BACKGROUND OF THE INVENTION

The present invention relates to the treatment of wastes, and more particularly to the processing of effluent sludge. Still more particularly, the present invention relates to apparatus for processing of effluent sludge.

Effluent sludge is a by-product of waste water clarification, that is the clarification of effluents from the sewage systems of towns and municipalities. The quantities of effluent sludge obtained as a result of waste water clarification are rather great and it is evident that it is necessary in some manner to dispose of this sludge. Conventionally, the sludge is stored in settling towers or tanks where it is exposed to the action of oxygen in the air and where it remains until it is digested; thereupon it is led to large settling fields where it is dried. Alternately, the drying can also be effected in special filters or presses which serve to partially remove the water content. However, after already undergoing all of these processing steps, the sludge is evidently not yet disposed of; to do this it is necessary to take the thus prepared sludge and burn it, or subject it to further thermal drying in order to withdraw moisture to the point where the residue can be used as agricultural fertilizer.

Evidently, all of these processing steps are time consuming, require expensive plants which are large and which therefore need much space, and are generally bothersome. Especially with respect to the size of the plants required for the processing, it is pointed out that frequently inadequate space is available near the town or municipality, with the result that the plants must be located more or less remote from the town or municipality and must be connected with the municipal effluent clarification system via pumping conduits which may frequently have a length of several miles.

Finally, there is the fact that even if the effluent sludge is processed to the point where it can be used as an agricultural fertilizer, it is not much in demand, so that the only really practical method for disposing of the sludge has been that of burning it.

SUMMARY OF THE INVENTION

It is, accordingly, a general object of the present invention to overcome these disadvantages.

A more particular object of the present invention is to provide an apparatus for disposing of effluent sludge in a simple, inexpensive and reliable fashion substantially as it is produced.

Evidently, the refuse—that is commercial as well as household refuse—of towns and municipalities must be processed in any case, and a widely used approach to this problem is to subject the refuse to grinding. Particularly suitable for this purpose are impact grinders which are capable of accepting all types of refuse, including bulky items. According to the invention, the effluent sludge is admixed with the refuse, it being evident that a homogenous mixing must take place. Thereupon, the refuse admixed with the effluent sludge can be disposed of in the usual manner. It is emphasized that in accordance with the present invention, it is essential that the admixture take place in an impact grinder. Other types of grinders, such as grinders constructed according to the hammer-mill principle, will not operate properly because, if effluent sludge is added to the refuse being processed, the mill will quickly become clogged and will further undergo particularly high wear. Furthermore, the use of grinders constructed on the hammer-mill process is not practical because these grinders are not suitable for grinding bulky refuse so that the versatility of the invention would be drastically reduced if use were to be made of grinders other than impact grinders.

Impact grinders, on the other hand, have a large grinding chamber which on the one hand is advantageous for the mixing procedure wherein the refuse is being admixed with the effluent sludge, whereas on the other hand the size of the refuse of the grinding chamber discourages clogging. Our deliberations have shown that if an impact grinder is, for instance, used for grinding domestic refuse, the ratio of refuse and effluent sludge admixed therewith may be on the order of 1:0.5.

It is possible to admix the effluent sludge with the solid refuse in the impact grinder in several ways. Thus, the effluent sludge or a part thereof may be admitted into the impact grinder downstream of the last impact chamber thereof, that is at a location where the circulating ground refuse has been accelerated by the rotor to a high speed and advances in form of a thin veil or fog of ground material. In this case, it is advantageous to guide this finely ground veil of material over a slide, and to simultaneously let a thin layer of the effluent sludge flow over this slide. In this manner, the surfaces of the individual refuse particles are intimately coated and wetted with the effluent sludge which adheres thereto without any necessity for the effluent sludge to come into contact with the grinding instrumentalities of the impact grinder, thereby avoiding increased wear of these grinding elements as a result of contact with the effluent sludge in conjunction with ash contents of the refuse.

A further possibility is to admit a part of the effluent sludge—for instance, one-half—into the grinding chamber for admixture with the refuse prior to or during the grinding, and to admix the remainder of the effluent sludge with the mixture of ground refuse and initially admitted effluent sludge which issues from the grinding chamber. The total quantity of effluent sludge added amounts to approximately one-half of the refuse by weight.

It will be appreciated that the ground refuse admixed with the effluent sludge in accordance with the present invention can subsequently be treated, in conventional manner, that is it can either be allowed to rot or become digested—an action which is greatly increased and facilitated by the addition of the effluent sludge—or the mixture may be burned.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a somewhat diagrammatic vertical section of an apparatus according to the present invention.

DESCRIPTION OF THE PREFERRED EMBODIMENTS

Discussing now the drawing in detail, it will be seen that reference numeral 1 diagrammatically identifies a conveyor which serves to advance solid refuse to be ground. Of course, while diagrammatically a belt conveyor 1 is shown, other advancing means can be utilized.

An impact grinder is generally identified with reference numeral 2 and contains in known manner a rotor 4 which is provided with grinding instrumentalities such as teeth 3 on its exterior surface. Reference numeral 5 identifies the grinding chamber of the impact grinder and it will be appreciated by those skilled in the art that in conventional manner refuse admitted via the conveyor 1 into the chamber 5 will be contacted by the teeth 3 in response to rotation of the rotor 4, and flung around in the chamber 5, with the refuse being torn by contact with the teeth 3 and being reduced to particulate state by this contact, as well as by impacts on the wall means surrounding the chamber 5. The wall means i.e. impact plate 6 which cooperates with the rotor 4, and which is tiltable about the illustrated axis, which latter is not identified with reference numerals, is provided with a set of teeth 7 located proximal to the circumference of the rotor 4, but in such a manner as not to interfere with the rotation thereof or with the teeth 3 of the rotor 4, in order to obtain improved grinding effects. Similar wall means i.e. impact plate 8, analogous to the wall means 6, is arranged somewhat downstream of the wall means 6, and the broken line intersecting the lower edges of the teeth 7 shows how ground refuse impacting upon the wall means 8 will be flung away substantially tangentially in the sense indicated by the broken line 9.

The illustrated embodiment uses two possibilities for admitting effluent sludge. Firstly, there is arranged in the inlet region of the impact grinder 2, above the inlet 10 leading to the chamber 5, a receptacle 11 into which the effluent sludge is admitted in suitable manner, not illustrated in detail because it does not form a part of the invention. Valves may be provided for controlling the admission of effluent sludge into the receptacle 11. The latter is provided with an overflow edge 12 over which the effluent sludge continuously flows in a fine sheet, as symbolized by the dot-dash line. The thus-overflowing sludge enters through the inlet 10 into the grinding chamber 5, together with the incoming solid refuse, and is subjected to intimate homogeneous admixture with the refuse as the same is being ground in the grinding chamber 5. Because of the resulting increase of exposed surface areas, occurring as a result of the breaking-up of the refuse into small particles, the ability of the refuse to absorb the sludge is vastly increased, in conjunction with the fact that these surface areas are constantly and advantageously exposed to the sludge during the grinding process.

The sludge admitted via the receptacle 11 amounts to only a portion—approximately half—of the total sludge which is to be admixed with the refuse passing through the impact grinder 2. Accordingly, there is arranged downstream of the wall means 8 a conduit 13 extending lengthwise of the wall means 8, that is in the direction normal to the plane of the drawing, and this is provided with a slot 14 as illustrated, over a lower edge of which a thin sheet of effluent sludge which is admitted into the conduit 13 as shown, will continuously flow in downward direction. Associated with the lower edge is a distributor baffle 15 extending along the lower edge over which the effluent sludge flows downwardly. It is evident that in its path the downwardly flowing effluent sludge on the baffle 15 intersects the broken line representing the direction in which ground refuse leaving the grinding chamber 5 is flung off, so that there occurs a constant and intimate admixture between this flung-off refuse and the effluent sludge flowing over the baffle 15.

Of course, it will be appreciated that modifications are readily possible in the illustrated embodiment without departing in any way from the scope and concept of the present invention. Thus, the receptacle 11 could be omitted, or conversely the conduit 13 could be omitted. In either case, the totality of effluent sludge to be admitted would then enter via the remaining conduit 13 or receptacle 11, respectively. Furthermore, all of the effluent sludge could be admitted directly into the grinding chamber 5, or again a part of the effluent sludge could be admitted directly into the grinding chamber 5 with the remainder admitted via the conduit 13 as illustrated. In addition it will be clear that other structural details can be varied in the impact grinder 2, for instance, the teeth 3 which are fast with the rotor 4 in the illustrated embodiment can be replaced by other striking instrumentalities, for instance movable hammers or the like, without in any way affecting the concept of the invention.

It will be understood that each of the elements described above, or two or more together, may also find a useful application in other types of constructions differing from the types described above.

While the invention has been illustrated and described as embodied in an apparatus for processing effluent sludge, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be protected by Letters Patent is set forth in the appended

1. An apparatus for disposing of effluent sludge, comprising an impact grinder for converting solid refuse, including bulky components, to particulate state, said impact grinder comprising a rotor journalled for rotation about a horizontal axis and having a periphery provided with beating instrumentalities which travel upwardly at one side of a vertical plane passing through said axis, during one half of each rotor revolution and downwardly at the opposite side of said vertical plane during the other half of each rotor revolution, a housing surrounding said rotor and defining with said rotor at least one large grinding chamber located above said rotor, and impact plates delimiting said chamber located at said opposite side of said vertical plane; feed means for feeding solid refuse, including bulky components, into said impact grinder at said one side of said vertical plane for engagement by said beating instrumentalities and conversion to particulate state; and supply means for supplying a flow of effluent sludge into said impact grinder for admixing with said refuse.

2. An apparatus as defined in claim 1, wherein said supply means comprises a receptacle having an overflow edge over which the sludge flows onto said solid refuse.

3. An apparatus as defined in claim 1, said impact grinder having an inlet for said solid refuse; and wherein said supply means is arranged in said inlet above the incoming solid refuse.

4. An apparatus as defined in claim 1, wherein said supply means is operative for supplying said flow of effluent sludge into said impact grinder in the region of the incoming solid refuse.

5. An apparatus as defined in claim 1, said grinding chamber having an outlet from which particulate ground refuse issues; and wherein said supply means is operative for supplying said flow of effluent sludge into said impact grinder in the region of said outlet.

6. An apparatus as defined in claim 5, said supply means comprising a supply conduit extending along and above said outlet and having a slot, and a distributor baffle extending along said slot and being downwardly inclined so that effluent sludge flows in form of a thin layer over said baffle and onto the ground refuse issuing from said outlet.

7. An apparatus as defined in claim 1, wherein said supply means comprises first means for supplying one portion of said effluent sludge into said impact grinder in the region of the incoming solid refuse, and second means for supplying an other portion of said effluent sludge in the region of said downstream end of said chamber.

8. An apparatus as defined in claim 7, wherein said second means comprises conduit means for supplying said other portion of said effluent sludge into said impact grinder downstream of said impact plates.

* * * * *